(12) United States Patent
Miu et al.

(10) Patent No.: US 12,013,554 B2
(45) Date of Patent: *Jun. 18, 2024

(54) QUANTUM-DOT COMPOSITE FILM AND THE METHOD TO MAKE THE SAME

(71) Applicant: UBRIGHT OPTRONICS CORPORATION, Taoyuan (TW)

(72) Inventors: Chia-Yeh Miu, Taoyuan (TW); Chia-Jung Chiang, Taoyuan (TW); Chien-Chih Lai, Taoyuan (TW); Lung-Pin Hsin, Taoyuan (TW); Yi-Long Tyan, Taoyuan (TW); Jeffrey Wu, Taoyuan (TW); Hui-Yong Chen, Taoyuan (TW)

(73) Assignee: UBRIGHT OPTRONICS CORPORATION, Taoyuan (TW)

( * ) Notice: Subject to any disclaimer, the term of this patent is extended or adjusted under 35 U.S.C. 154(b) by 511 days.

This patent is subject to a terminal disclaimer.

(21) Appl. No.: 17/078,082

(22) Filed: Oct. 22, 2020

(65) Prior Publication Data

US 2021/0124098 A1 Apr. 29, 2021

Related U.S. Application Data

(60) Provisional application No. 62/925,234, filed on Oct. 24, 2019.

(51) Int. Cl.
| | |
|---|---|
| *B29C 48/16* | (2019.01) |
| *B29B 15/10* | (2006.01) |
| *B29C 48/00* | (2019.01) |
| *B82Y 20/00* | (2011.01) |
| *B82Y 30/00* | (2011.01) |
| *B82Y 40/00* | (2011.01) |
| *C08L 67/02* | (2006.01) |
| *C09K 11/02* | (2006.01) |
| *G02B 5/02* | (2006.01) |
| *G02B 5/04* | (2006.01) |
| *G02F 1/017* | (2006.01) |
| *B29K 67/00* | (2006.01) |

(52) U.S. Cl.
CPC ............ *G02B 5/0242* (2013.01); *B29B 15/10* (2013.01); *B29C 48/0018* (2019.02); *B29C 48/16* (2019.02); *C08L 67/02* (2013.01); *C09K 11/02* (2013.01); *G02B 5/045* (2013.01); *G02F 1/01791* (2021.01); *B29K 2067/003* (2013.01); *B29K 2995/0018* (2013.01); *B29K 2995/0053* (2013.01); *B82Y 20/00* (2013.01); *B82Y 30/00* (2013.01); *B82Y 40/00* (2013.01); *C08L 2203/16* (2013.01); *G02B 2207/113* (2013.01)

(58) Field of Classification Search
None
See application file for complete search history.

(56) References Cited

U.S. PATENT DOCUMENTS

2015/0338567 A1* 11/2015 Stevenson ............ G02B 6/0051
362/330

* cited by examiner

*Primary Examiner* — Sheeba Ahmed
(74) *Attorney, Agent, or Firm* — Min-Lee Teng

(57) ABSTRACT

The present invention discloses a quantum-dot composite optical film comprising: a plurality of quantum dots dispersed in the optical film, wherein the plurality of quantum dots are capable of being water-resistant and oxygen-resistant; and a plurality of prisms, disposed over the quantum-dot layer.

11 Claims, 6 Drawing Sheets

QUANTUM-DOT COMPOSITE FILM AND THE METHOD TO MAKE THE SAME

CROSS-REFERENCE TO RELATED APPLICATION

This application claims the benefit of U.S. provisional patent application No. 62/925,234, filed on Oct. 24, 2019, which is hereby incorporated herein by reference.

BACKGROUND OF THE INVENTION

1. Field of the Invention

The present invention relates to a quantum-dot film, and more particularly to a quantum-dot composite film.

2. Description of Related Art

The quantum dot is a semiconductor particle having a nanometer size and a spherical shape. The colored spectrum can be generated when the quantum dots are excited by light or electricity. The color of the excited light is determined according to the material and the size of the quantum dot. Because quantum dots can change the color of the light emitted by a light source, they can be widely used in display devices, such as liquid crystal displays (LCD). The quantum dots can enhance the color gamut, the color and the brightness of the display device such that the display device can have a color gamut of about 110% NTSC (National Television System Committee).

The quantum dot is commonly made of IV, II-VI, IV-VI or III-V elements, such as Si, Ge, CdS, CdSe, CdTe, ZnSe, PbS, PbSe, InP and InAs, where the most widely used are mainly CdSe and InP. QD Vision mainly uses CdSe as the material of the quantum dot, Nanoco mainly uses InP as the material of the quantum dot and Nanosys uses a combination of CdSe and InP as the material of the quantum dot. There are advantages and disadvantages for each of the CdSe quantum dot and the InP quantum dot. The CdSe quantum dot has a high luminance efficiency and has better color gamut performance, but it contains a heavy metal, such as Cd. The InP quantum dot doesn't have Cd, so it isn't limited by the criterion of RoHS (Restriction of Hazardous Substances) set up by the EU (European Union).

The features of the quantum dots used in display devices include: (1) high color pureness and the peak shown in the spectrum is narrower and symmetrically distributed; (2) controlling the size and the material of the quantum dot can change the wavelength of the emission light to further adjust the color of the light, which can be shown in the emission spectrum; (3) better performance in the color with color gamut greater than 110% NTSC; (4) quantum efficiency of at least 90%, so light stability is good; (5) potentially achieving pixels of a nanometer-class, and as such, quantum dots can be used for manufacturing a screen of the highest resolution.

Currently, quantum-dot televisions sold in the market use quantum-dot liquid crystal displays (QD LCD). There are two main backlight sources used in the quantum-dot liquid crystal display (QD LCD): the tubal quantum-dot backlight and the thin-film quantum-dot backlight. The tubal quantum-dot backlight is mainly produced by QD Vision in America and called Color IQ optical device. The thin-film quantum-dot backlight is mainly produced jointly by Nanosys and 3M and called QDEF thin-film.

Because the blue light can be transformed into three colored lights (RGB), the pureness of three colored lights (RGB) of the quantum-dot backlight is higher than that of the LED (Light-emitting diode) backlight. By controlling the material and the size of the quantum dot, a truer and more uniform color performance can be obtained.

Accordingly, the present invention proposes a new solution to overcome the above-mentioned disadvantages.

SUMMARY OF THE INVENTION

The quantum-dot layer of the quantum-dot film comprises a binder and a plurality of quantum dots dispersed in the binder. The quantum dots are capable of being water-resistant and oxygen-resistant enough without a barrier layer formed over/on each of the first major surface and the second major surface of the quantum-dot layer. The total thickness of the quantum-dot film having no barrier layer in the present invention can be less than the total thickness of the quantum-dot film having a barrier layer in the prior art; therefore, the present invention can decrease the total thickness of the quantum-dot film. In addition, because there is no barrier layer, not only is the manufacturing complexity of the quantum-dot film simplified, but the total manufacturing cost of the quantum-dot film is also reduced.

One objective of the present invention is to emboss an optical brightness enhancement layer on an optical film comprising a plurality of quantum dots to form a quantum-dot composite optical film.

One objective of the present invention is to emboss an optical brightness enhancement layer on an optical film comprising a plurality of quantum dots to form a quantum-dot composite optical film, wherein the plurality of quantum dots are capable of being water-resistant and oxygen-resistant.

One objective of the present invention is to emboss a plurality of prisms on an optical film comprising a plurality of quantum dots to form a quantum-dot composite optical film.

One objective of the present invention is to emboss a plurality of prisms on an optical film comprising a plurality of quantum dots to form a quantum-dot composite optical film, wherein the plurality of quantum dots are capable of being water-resistant and oxygen-resistant.

In one embodiment, the present invention discloses a quantum-dot composite optical film comprising: a quantum-dot layer comprising a binder and a plurality of quantum dots dispersed in the binder; a first barrier layer, disposed over the quantum-dot layer; and a plurality of prisms, disposed over the first barrier layer.

In one embodiment, the present invention discloses a quantum-dot composite optical film comprising: a quantum-dot layer comprising a binder and a plurality of quantum dots dispersed in the binder; and a plurality of prisms, disposed over the quantum-dot layer.

In one embodiment, the plurality of prisms comprises a photo-curable material.

In one embodiment, the plurality of prisms comprises a thermally-curable material.

In one embodiment, the quantum-dot layer further comprises a plurality of diffusing particles.

In one embodiment, a quantum dot comprises Cd.

In one embodiment, wherein the concentration of the quantum dots in the quantum-dot layer is 0.05-20%.

In one embodiment, wherein the concentration of the quantum dots in the quantum-dot layer is 0.05-8%.

In one embodiment, the binder comprises at least one of the following: PET (polyethylene terephthalate), PEN (polyethylene naphtholate), PAR (polyacrylate), PC (polycarbonates) and TAC (cellulose triacetate).

In one embodiment, the plurality of prisms that are embossed on the quantum-dot layer.

In one embodiment, an adhesive layer is disposed on the quantum-dot layer, the plurality of prisms that are adhered to the adhesive layer.

In one embodiment, the present invention discloses a quantum-dot composite optical film comprising: a plurality of quantum dots disposed therein, wherein the plurality of quantum dots are capable of being water-resistant and oxygen-resistant; and a plurality of prisms, disposed over the quantum-dot layer.

In one embodiment, the plurality of prisms comprises a photo-curable material.

In one embodiment, the plurality of prisms comprises a thermally-curable material.

In one embodiment, the quantum-dot layer further comprises a plurality of diffusing particles.

In one embodiment, a quantum dot comprises Cd.

In one embodiment, wherein the concentration of the quantum dots in the quantum-dot layer is 0.05-20%.

In one embodiment, wherein the concentration of the quantum dots in the quantum-dot layer is 0.05-8%.

In one embodiment, the present invention discloses a quantum-dot composite optical film comprising: a plurality of quantum dots dispersed therein, wherein the plurality of quantum dots are capable of being water-resistant and oxygen-resistant; and an optical brightness enhancement layer, disposed over the quantum-dot layer.

In one embodiment, the present invention discloses a method for forming a quantum-dot film, comprising: performing a process on a plurality of quantum dots for enabling the plurality of quantum dots to be water-resistant and oxygen-resistant; forming a quantum-dot layer comprising a binder and the plurality of quantum dots dispersed in the binder, wherein the plurality of quantum dots are capable of being water-resistant and oxygen-resistant; and disposing an optical brightness enhancement layer over the quantum-dot layer.

In one embodiment, the optical brightness enhancement layer comprises a plurality of prisms.

In one embodiment, the present invention discloses a method for forming a quantum-dot film, comprising: performing a process on a plurality of quantum dots for enabling the plurality of quantum dots to be water-resistant and oxygen-resistant; forming a quantum-dot layer comprising a binder and the plurality of quantum dots dispersed in the binder, wherein the plurality of quantum dots are capable of being water-resistant and oxygen-resistant; and disposing a plurality of prisms layer over the quantum-dot layer.

In one embodiment, the plurality of prisms comprises a photo-curable material.

In one embodiment, the plurality of prisms comprises a thermally-curable material.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as following. The described preferred embodiments are presented for purposes of illustrations and description and they are not intended to limit the scope of the present invention.

Figure 1:
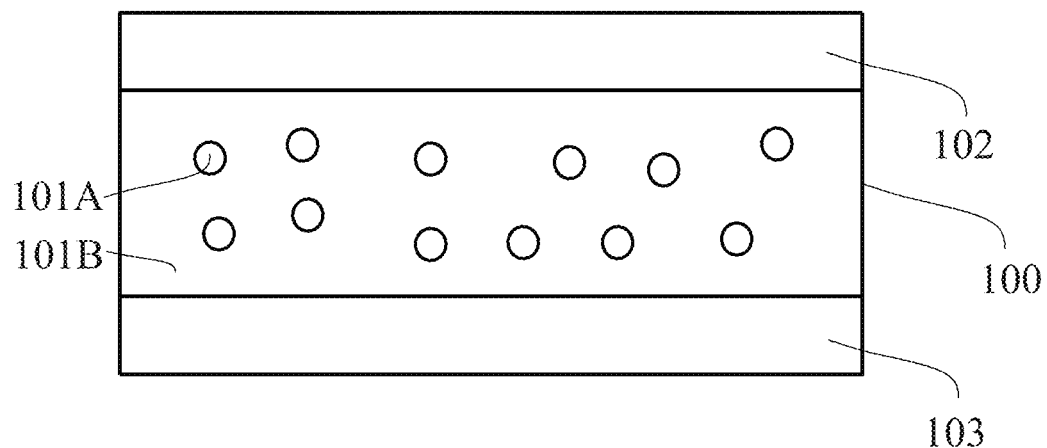
FIG. 1 illustrates a schematic cross-sectional view of a quantum-dot film.

FIG. 1 illustrates a schematic cross-sectional view of a quantum-dot composite optical film of the present invention, wherein a quantum-dot film 100 comprises a binder 101B and a plurality of quantum dots IOTA dispersed in the binder 101B, wherein a first PET (polyethylene terephthalate) layer 102 and a second PET layer 103 are respectively disposed over a top and a bottom surface of the quantum-dot film 100.

Figure 2:
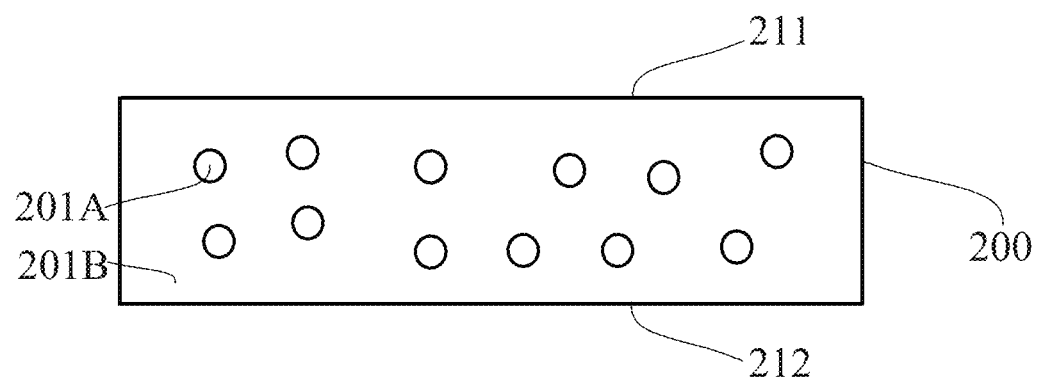
FIG. 2 illustrates a schematic cross-sectional view of a quantum-dot film in the present invention according to one embodiment of the present invention.

FIG. 2 illustrates a schematic cross-sectional view of a quantum-dot film 200 in the present invention. The quantum-dot film 200 comprises a binder 201B and a plurality of quantum dots 201A dispersed in the binder 201B. The thickness of the quantum-dot film 200 can be in the range from 25 μm to 350 μm.

The quantum dots 201A have a high stability when exposed to high temperature or heat, so the surface of the quantum dots 201A can be specially treated to improve the ability of resisting environmental damage caused by water and oxygen; therefore, the quantum dots 201A are capable of being water-resistant and oxygen-resistant enough without a barrier layer formed over/on each of the first major surface 211 and the second major surface 212 of the quantum-dot film 200.

The quantum-dot film 200 is capable of being supported by itself without a supporting layer formed over each of the first major surface 211 and the second major surface 212 of the quantum-dot film 200. Therefore, the material of the binder 201B of the quantum-dot film 200 should be selected such that the quantum-dot film 200 is capable of being supported by itself without a supporting layer formed over each of the first major surface 211 and the second major surface 212 of the quantum-dot film 200. In addition, the material of the binder 201B of the quantum-dot film 200 should be selected such that the quantum dots 201A in the quantum-dot film 200 is protected from damage caused by oxygen or water. The material of the binder 201B can include at least one of the following: PET (polyethylene terephthalate), PEN (polyethylene naphtholate), PAR (polyacrylate), PC (polycarbonates) and TAC (cellulose triacetate). Preferably, the material is PET (polyethylene terephthalate). The material can be pure PET (polyethylene terephthalate). The material of the binder 201B can be unitary or homogeneous.

The quantum dots 201A can comprise green quantum dots and red quantum dots. The material of the quantum dots 201A can comprise CdS, CdSe, CdTe, ZnSe, PbS, PbSe, InP, InAs, InGaP, ZnS or ZnTe, but the present invention is not limited thereto. The material of the quantum dots 201A can comprise Cd (e.g., CdSe) or be Cd-free (e.g., InP). The concentration of the quantum dots 201A can be in the range from 0.1% to 20%, preferably, from 0.3 to 8%.

In one embodiment, wherein the concentration of the quantum dots in the quantum-dot film is 0.05-20%.

In one embodiment, wherein the concentration of the quantum dots in the quantum-dot film is 0.05-8%.

In one embodiment, the thickness of the quantum-dot film is 25-350 um.

Optionally, the quantum-dot film 200 can comprise a plurality of diffusing particles (not shown); the diffusing particles are further provided to increase the uniformity of the quantum dots 201A dispersed in the binder 201B. The material of the diffusing particles can be organic (e.g., PMMA (polymethyl methacrylate), PS (polystyrene), Melamine) or inorganic (e.g., silicon, $SiO_2$, $TiO_2$, $CaCO_3$, $Al_2O_3$, $ZrO_2$). The concentration of the diffusing particles can be in the range from 2% to 40%, preferably, from 5% to 15%.

Figure 3:
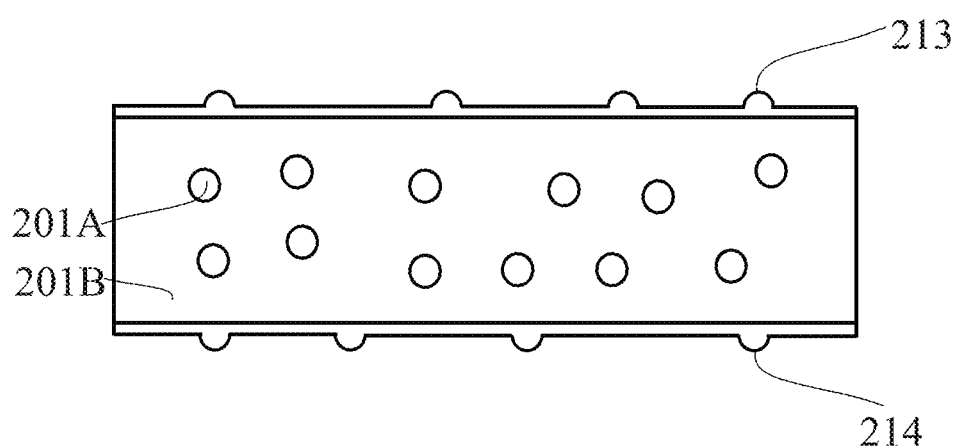
FIG. 3 illustrates a schematic cross-sectional view of the quantum-dot film in the present invention, wherein each of the first major surface and the second major surface of the quantum-dot layer is a structured surface according to one embodiment of the present invention.

Each of the first major surface 211 and the second major surface 212 of the quantum-dot film 200 can be a structured surface 213, 214 (see the quantum-dot film 250 in FIG. 3). The structured surface 213, 214 can be used for reducing the undesired photo phenomenon, such as Newton's rings. The matt structure can be used to forming each of the first major surface 211 and the second major surface 212 of the quantum-dot film 200.

The manufacturing method for forming the quantum-dot film 200 is described as follows.

The method for forming a quantum-dot film 200 comprises forming a quantum-dot film 200 comprising a binder 201B and a plurality of quantum dots 201A dispersed in the binder 201B. Forming the quantum-dot film 200 comprises performing a process on the quantum dots 201A and the material such that the plurality of quantum dots 201A is dispersed in the binder 201B. The process can be a co-extrusion process.

The material of the binder 201B can comprise a first portion and a second portion, wherein the quantum dots 201A and the first portion of the material are combined into a first component and the second portion of the material is formed into a second component, wherein the process is performed on the first component and the second component such that the quantum dots 201A are dispersed in the binder 201B. The process can be a co-extrusion process.

For convenience of explanation, the material of the binder 201B is PET in Embodiment A1 of the invention; however, the present invention is not limited to this case. After the quantum dots 201A are uniformly dispersed by a dispersion process, the quantum dots 201A and a first portion of PET can be combined into a first component (e.g., by the twin screw extruder or the micro-twin screw extruder). The first component (i.e. QD in PET) can be in the form of a plurality of first chips. The first component may have a high concentration of the quantum dots 201A. The first component may have a better light-emitting effect and a better light-emitting uniformity. The second component can be made of pure PET or have a high concentration of PET. The second component (i.e. PET) can be in the form of a plurality of second chips (i.e. PET chips). The first component and the second component can be formed into the quantum-dot film 200 in the present invention based on a suitable mass ratio thereof (e.g., by the co-extrusion process).

The first component and the second component can be combined into a composite mixture (e.g., by the twin screw extruder or the micro-twin screw extruder), wherein the process is performed on the composite mixture such that the quantum dots 201A are dispersed in the binder 201B. The composite mixture may have a better light-emitting effect and a better light-emitting uniformity. The process can be a co-extrusion process.

The material of the binder 201B can comprise a first portion, a second portion and a third portion, wherein the quantum dots 201A and the first portion of the material are combined into a first component, the second portion of the material is formed into a second component, and the diffusing particles and the third portion of the material are combined into a third component, wherein the process is performed on the on the first component, the second component and the third component such that the quantum dots 201A are uniformly dispersed in the binder 201B. The process can be a co-extrusion process.

For convenience of explanation, the material of the binder 201B is PET in Embodiment A2 of the invention; however, the present invention is not limited to this case. Compared to Embodiment A1 in which the first component and the second component are provided, Embodiment A2 further comprises a third component. After the diffusing particles are uniformly dispersed by a dispersion process, the diffusing particles and a third portion of PET can be combined into a third component (e.g., by the twin screw extruder or the micro-twin screw extruder). The third component (i.e. diffusing particles in PET) can be in the form of a plurality of third chips. The third component may have a high concentration of the diffusing particles. The first component, the second component and the third component can be formed into the quantum-dot film 200 in the present invention based on a suitable mass ratio thereof (e.g., by the co-extrusion process).

The first component, the second component and the third component are combined into a composite mixture (e.g., by the twin screw extruder or the micro-twin screw extruder), wherein the process is performed on the composite mixture such that the quantum dots 201A are uniformly dispersed in the binder 201B. The composite mixture may have a better light-emitting effect and a better light-emitting uniformity. The process can be a co-extrusion process.

The quantum dots 201A can comprise green quantum dots and red quantum dots. The green quantum dots and a portion of PET can be combined into a first sub-component (e.g., by the twin screw extruder or the micro-twin screw extruder). The red quantum dots and another portion of PET can be combined into a second sub-component (e.g., by the twin screw extruder or the micro-twin screw extruder). The first sub-component and the second sub-component can be regarded as the first component in each of Embodiment A1 and Embodiment A2.

The process can be a co-extrusion process which is one of the stretch-forming technologies used for film-forming. The stretch-forming technology can be a bi-axially stretch-forming technology. The co-extrusion is a process in which two or more plastic materials, each of which has a property $X_j$, are extruded and combined to form a structure having a combination of the properties $X_1, X_2, \ldots X_N$ (N is integer and larger than 1) of the two or more plastic materials. When performing the co-extrusion process by using two plastic materials in Embodiment A1, one plastic material can be the first component and the other plastic material can be the second component. When performing the co-extrusion process by using three materials in Embodiment A2, one plastic material can be the first component, another material can be the second component and the other plastic material can be the third component.

For convenience of explanation, the material of the binder 201B is PET and the material of the diffusing particles is PMMA in further described Embodiment A2 of the invention; however, the present invention is not limited to this case. Place PET chips in the oven and dry PET chips at 100° C. for 24 hours. Place PMMA beads in the oven and dry PMMA beads at 100° C. for 24 hours. Prepare the first mixture having the green quantum dots and the PET chips. The mass of the green quantum dots is 8 g and the mass of the PET chips is 72 g. Pre-uniform the first mixture and place the first mixture in the twin screw extruder (or the micro-twin screw extruder, or the micro-extruder). Perform a heat dispersion (or nano-dispersion) process on the first mixture at 280° C. in the twin screw extruder (by the high shear force) for 10 minutes to form the first sub-component (i.e. GQD in PET). The first sub-component may have a high concentration of the green quantum dots. Prepare the second mixture having the red quantum dots and the PET chips. The mass of the red quantum dots is 20 g and the mass of the PET chips is 72 g. Pre-uniform the second mixture and place the second mixture in the twin screw extruder (or the micro-twin screw extruder, or the micro-extruder). Perform a heat dispersion (or nano-dispersion) process on the second mixture at 280° C. in the twin screw extruder (by the high shear force) for 10 minutes to form the second sub-component (i.e. RQD in PET). The second sub-component may have a high concentration of the red quantum dots. The first sub-component and the second sub-component can be regarded as the first component in Embodiment A2. Prepare the third mixture having the PMMA beads and the PET chips. The mass of the PMMA beads is 32 g and the mass of the PET chips is 48 g. Pre-uniform the third mixture and place the third mixture in the twin screw extruder (or the micro-twin screw extruder, or the micro-extruder). Perform a heat dispersion (or nano-dispersion) process on the third mixture at 280° C. in the twin screw extruder (by the high shear force) for 10 minutes to form the third component (i.e. PMMA in PET). Prepare the fourth mixture having the first sub-component (i.e. GQD in PET), the second sub-component (i.e. RQD in PET), the third component (i.e. PMMA in PET) and the second component (i.e. PET chips). The mass of the first sub-component is 13 g, the mass of the second sub-component is 6 g, the mass of the third component is 16 g and the second component is 30 g. Place the fourth mixture in the twin screw extruder (or the micro-twin screw extruder, or the micro-extruder). Perform a heat dispersion (or nano-dispersion) process on the fourth mixture at 280° C. in the twin screw extruder (by the high shear force) for 10 minutes to form the composite mixture. Finally, the composite mixture is formed into a quantum-dot film 200 (by the hot plate).

In one embodiment, the plurality of quantum dots are dispersed into the spaces between particles of the PET by a micro-twin screw extruder nano-dispersion processing technology.

In one embodiment, a PET co-extrusion and biaxial stretching technology is used to form a PET quantum-dot optical-film. The PET quantum-dot optical-film does not need to have an additional gas barrier film (gas barrier film) and can still achieve a same anti-environmental test level.

Figure 4:
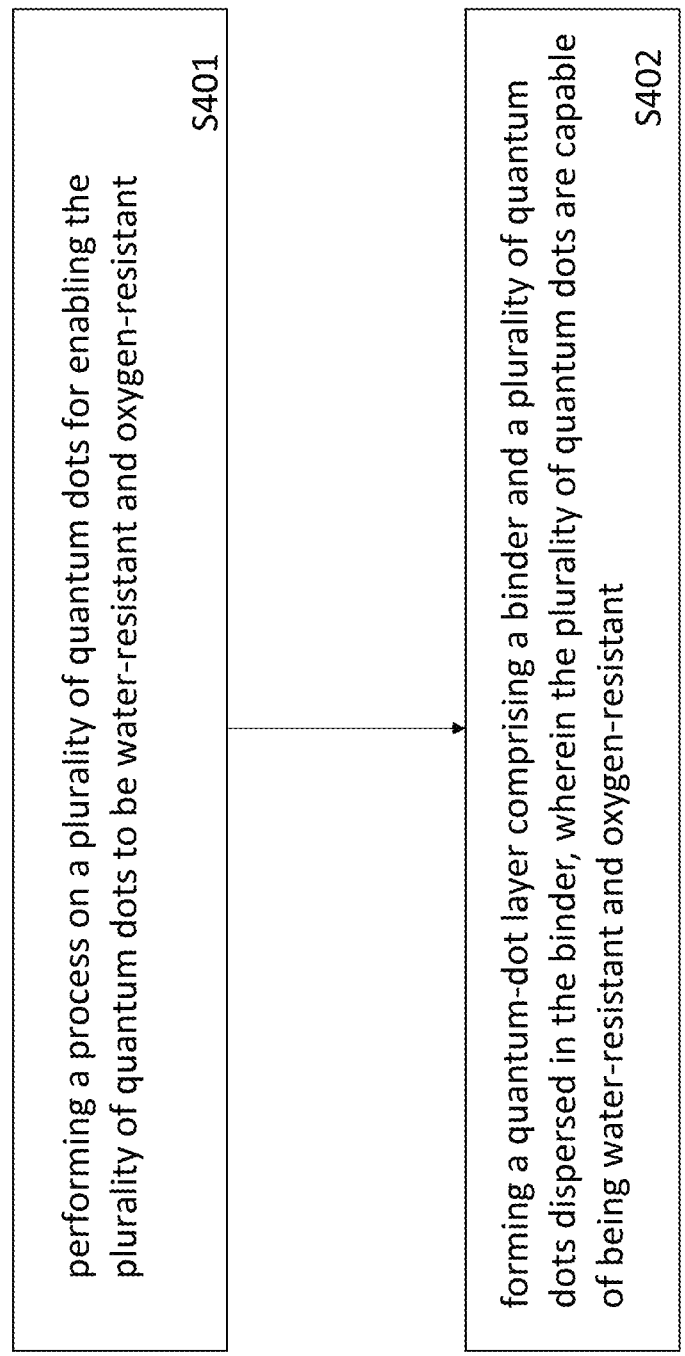
FIG. 4 illustrates a method for forming a quantum-dot film according to one embodiment of the present invention.

FIG. 4 illustrates a method for forming a quantum-dot film, in step S401: performing a process on the plurality of quantum dots for enabling the plurality of quantum dots to be water-resistant and oxygen-resistant; and in step S402: forming a quantum-dot layer comprising a binder and a plurality of quantum dots dispersed in the binder, wherein the plurality of quantum dots are capable of being water-resistant and oxygen-resistant.

Figure 5A:
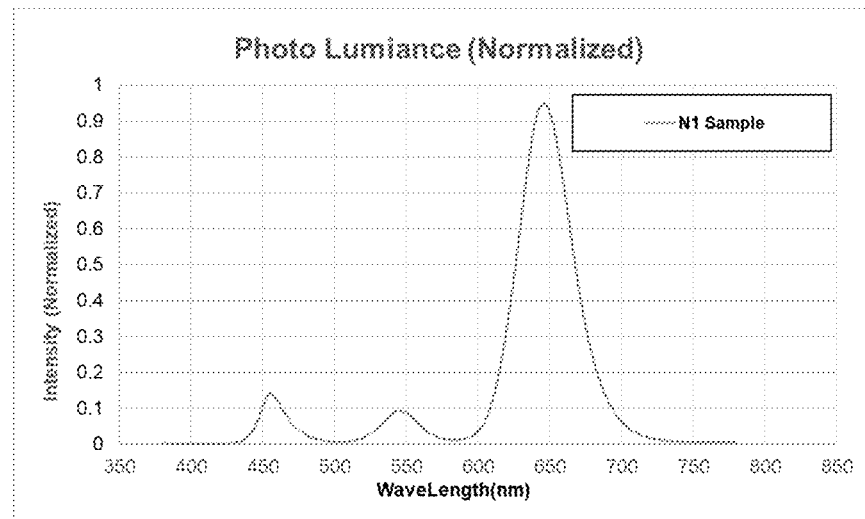
FIG. 5A illustrates the photo-luminance performance of the quantum-dot film in the present invention.
Figure 5B:
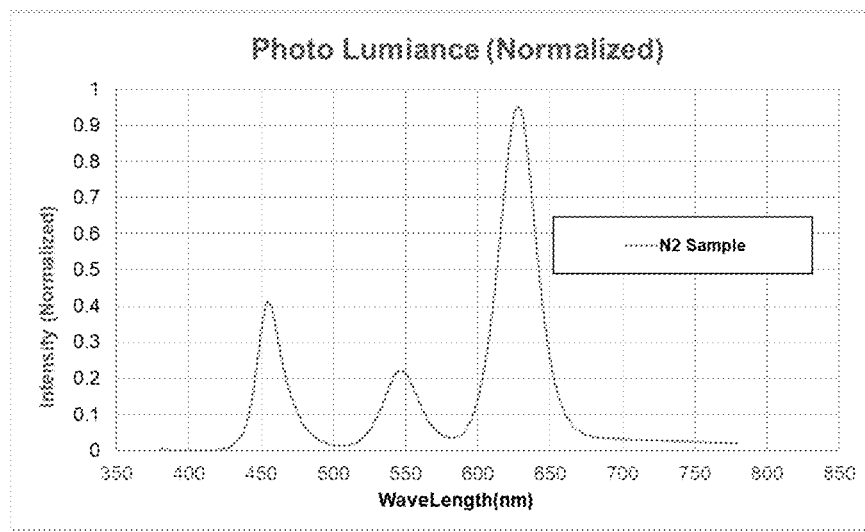
FIG. 5B illustrates the photo-luminance performance of the quantum-dot film in the present invention.

FIGS. 5A to 5B illustrate the photo-luminance performance of the quantum-dot film 200 in the present invention. Table 1 (shown below) illustrates one of the comparisons between quantum-dot film 100 in the prior art (see FIG. 1) and quantum-dot film 200 of the present invention (please see FIG. 2).

TABLE 1

| | Blue Light Intensity | Green Light | | Red Light | | L | x | y |
|---|---|---|---|---|---|---|---|---|
| | | Intensity | Wavelength (nm) | Intensity | Wavelength (nm) | | | |
| the quantum-dot film 100 in the prior art (see FIG. 1) | 100.00% | 100.00% | 528 | 100.00% | 626 | 100% | 0.2332 | 0.2065 |
| the quantum-dot film 200 in the present invention (see FIG. 2) | 83.41% | 70.32% | 546 | 118.58% | 628 | 81.21% | 0.271 | 0.1967 |

Figure 6A:
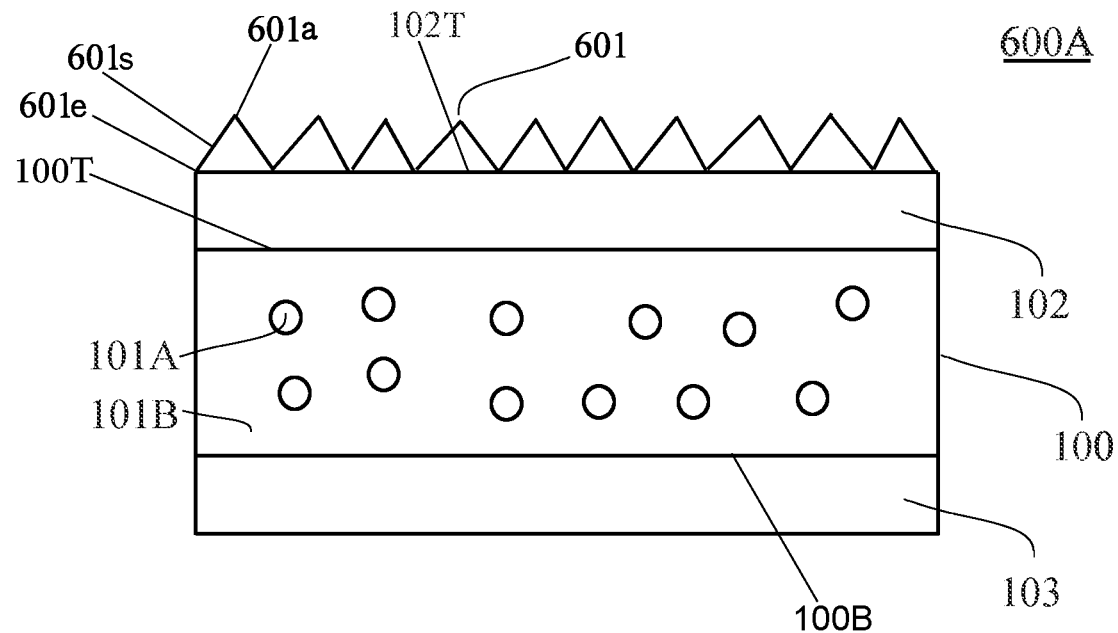
FIG. 6A illustrates a schematic cross-sectional view of a quantum-dot composite film according to one embodiment of the present invention.

FIG. 6A illustrates a schematic cross-sectional view of a quantum-dot composite optical film 600A in the present invention, wherein a quantum-dot film 100 comprises a binder 101B and a plurality of quantum dots 101A dispersed in the binder 101B, wherein a PET 102 and a PET layer 103 are respectively disposed over a top and a bottom surface of the quantum-dot film 100, wherein a plurality of prisms 601 are disposed over the PET 102 or the PET 103. As shown in FIG. 6A, the PET layer 102 is disposed on and in contact with the top surface 100T of the quantum-dot film 100, the plurality of prisms 601 are disposed on a top surface 102T of the PET layer 102 with an end point 601e of a side surface 601s of a prism 601a is in contact with the top surface 102T of the PET layer 102. As shown in FIG. 6A, the PET layer 103 is disposed on and in contact with the bottom surface 100B of the quantum-dot film 100.

Figure 6B:
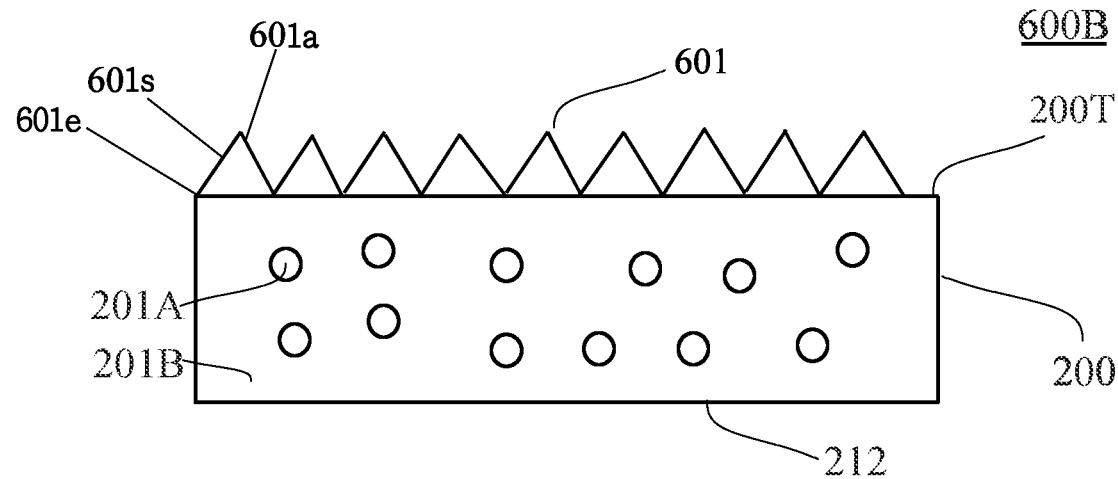
FIG. 6B illustrates a schematic cross-sectional view of a quantum-dot composite film according to one embodiment of the present invention.

FIG. 6B illustrates a schematic cross-sectional view of a quantum-dot composite optical film 600B in the present invention, wherein the quantum-dot film 200 comprises a binder 201B and a plurality of quantum dots 201A dispersed in the binder 201B. The thickness of the quantum-dot film 200 can be in the range from 25 μm to 350 μm, wherein a plurality of prisms 601 are disposed over the quantum-dot film 200. As shown in FIG. 6B, the plurality of prisms 601 are disposed on a top surface 200T of the quantum-dot film 200, wherein an end point 601e of a side surface 601s of a prism 601a is in contact with the top surface 200T of the quantum-dot film 200.

The quantum dots 201A have a high stability when exposed to high temperature or heat, so the surface of the quantum dots 201A can be specially treated to improve the ability of resisting environmental damage caused by water and oxygen; therefore, the quantum dots 201A are capable of being water-resistant and oxygen-resistant enough without a barrier layer formed over/on each of the first major surface 211 and the second major surface 212 of the quantum-dot film 200.

In one embodiment, the plurality of prisms comprises a photo-curable material.

In one embodiment, the plurality of prisms comprises a thermally-curable material.

In one embodiment, the quantum-dot layer further comprises a plurality of diffusing particles.

In one embodiment, a quantum dot comprises Cd.

In one embodiment, wherein the concentration of the quantum dots in the quantum-dot layer is 0.05-20%.

In one embodiment, wherein the concentration of the quantum dots in the quantum-dot layer is 0.05-8%.

In one embodiment, the binder comprises at least one of the following: PET (polyethylene terephthalate), PEN (polyethylene naphtholate), PAR (polyacrylate), PC (polycarbonates) and TAC (cellulose triacetate).

In one embodiment, an adhesive layer is disposed on the quantum-dot layer, wherein the plurality of prisms that are adhered to the adhesive layer.

In one embodiment, a quantum-dot composite optical film is disclosed, wherein the quantum-dot composite optical film comprises: a plurality of quantum dots dispersed in the optical film, wherein the plurality of quantum dots are capable of being water-resistant and oxygen-resistant; and an optical brightness enhancement layer, disposed over the quantum-dot layer.

Figure 7:
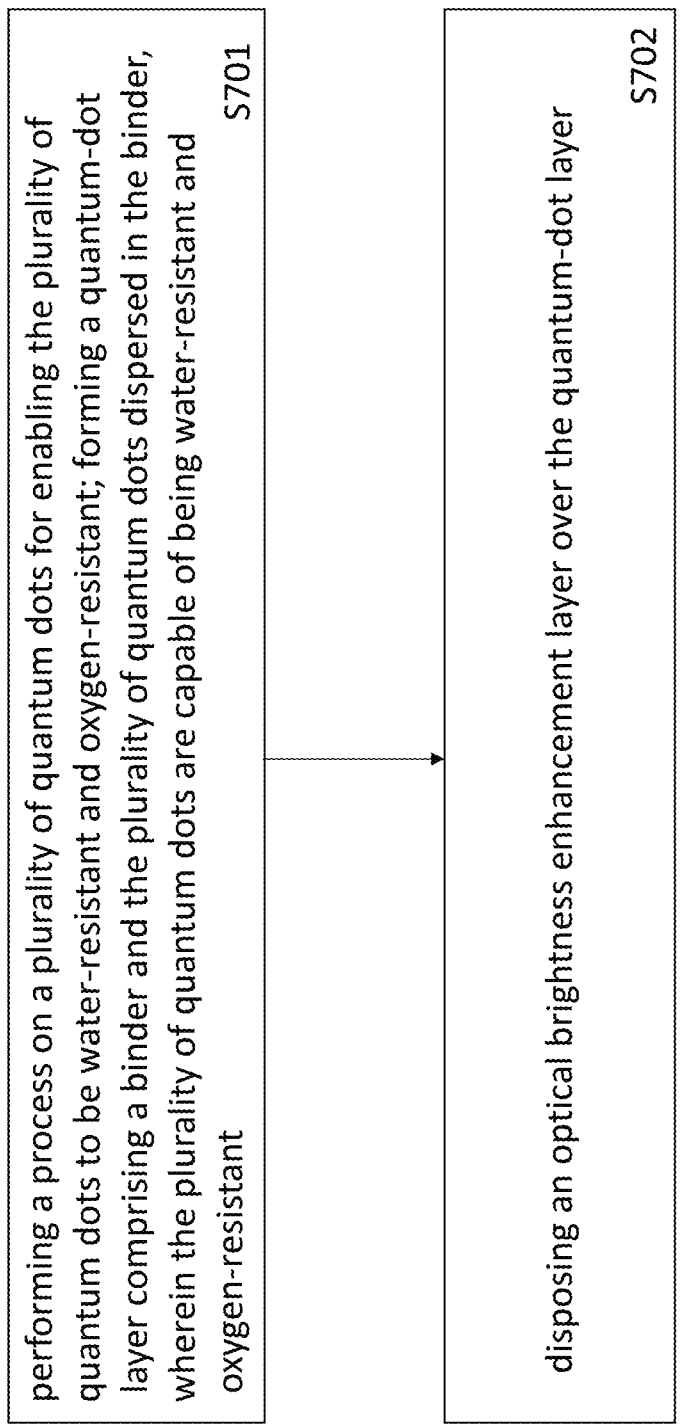
FIG. 7 illustrates a method for forming a quantum-dot composite film.

In one embodiment, please refer to FIG. 7, a method for forming a quantum-dot composite film is disclosed, wherein the method comprises: step 701: performing a process on a plurality of quantum dots for enabling the plurality of quantum dots to be water-resistant and oxygen-resistant; forming a quantum-dot layer comprising a binder and the plurality of quantum dots dispersed in the binder, wherein the plurality of quantum dots are capable of being water-resistant and oxygen-resistant; and step 702: disposing an optical brightness enhancement layer over the quantum-dot layer.

In one embodiment, the optical brightness enhancement layer comprises a plurality of prisms.

In one embodiment, the optical brightness enhancement layer comprises a photo-curable material.

In one embodiment, the optical brightness enhancement layer comprises a thermally-curable material.

In one embodiment, the optical brightness enhancement layer comprises a plurality of diffusing particles.

In one embodiment, a quantum dot comprises Cd.

In one embodiment, wherein the concentration of the quantum dots in the quantum-dot layer is 0.05-20%.

In one embodiment, wherein the concentration of the quantum dots in the quantum-dot layer is 0.05-8%.

In one embodiment, the binder comprises at least one of the following: PET (polyethylene terephthalate), PEN (polyethylene naphtholate), PAR (polyacrylate), PC (polycarbonates) and TAC (cellulose triacetate).

The present invention has the following advantages: 1. When the PET is stretched and formed, QD particles, which have high thermal stability and surface modification with water and oxygen resistance, are dispersed into the PET to produce a PET quantum-dot optical-film material, achieving the goal of effectively simplifying the production process and thinning. 2. due to the use of surface modification of QD particles with water and oxygen resistance, there is no need to use expensive gas barrier film so as to lower the overall cost as well as expanding the applications of the quantum-dot optical-film material in different fields. 3. the prisms can be directly coated on a quantum-dot optical film to simplify the production process and backlight assembly process.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A quantum-dot composite optical film comprising:
   a quantum-dot layer, comprising a binder, wherein a plurality of quantum dots and a plurality of diffusing particles are dispersed in the binder;
   a first PET (polyethylene terephthalate) layer, disposed on and in contact with a top surface of the quantum-dot layer; and
   a plurality of prisms, disposed on a top surface of the first PET layer with an endpoint of a side surface of a prism being in contact with the top surface of the first PET layer.

2. The quantum-dot composite optical film according to claim 1, wherein a second PET layer is disposed on and in contact with a bottom surface of the quantum-dot layer.

3. The quantum-dot composite optical film according to claim 1, wherein the plurality of prisms comprises a photo-curable material.

4. The quantum-dot composite optical film according to claim 1, wherein the plurality of prisms comprises a thermally-curable material.

5. The quantum-dot composite optical film according to claim 1, wherein the binder comprises at least one of the following: PET (polyethylene terephthalate), PEN (polyethylene naphtholate), PAR (polyacrylate), PC (polycarbonates) and TAC (cellulose triacetate).

6. The quantum-dot composite optical film according to claim 1, wherein the plurality of prisms are embossed on the quantum-dot layer.

7. The quantum-dot composite optical film according to claim 1, wherein an adhesive layer is disposed on the quantum-dot layer, wherein the plurality of prisms are adhered to the adhesive layer.

8. The quantum-dot composite optical film according to claim 1, wherein the plurality of quantum dots are capable of being water-resistant and oxygen-resistant.

9. A quantum-dot composite optical film comprising:
a quantum-dot layer, comprising a binder, wherein a plurality of quantum dots and a plurality of diffusing particles are dispersed in the binder, wherein the plurality of quantum dots are capable of being water-resistant and oxygen-resistant; and
a plurality of prisms, disposed on a top surface of the quantum-dot layer with an endpoint of a side surface of a prism being in contact with the top surface of the quantum-dot layer.

10. The quantum-dot composite optical film according to claim 9, wherein the plurality of prisms comprises a photo-curable material.

11. The quantum-dot composite optical film according to claim 9, wherein the plurality of prisms comprises a thermally-curable material.

* * * * *